United States Patent Office 3,285,870
Patented Nov. 15, 1966

3,285,870
COPOLYMERS OF EPIHALOHYDRINS AND GLYCIDYL ESTERS OF ETHYLENICALLY UNSATURATED ACIDS
Edwin J. Vandenberg, Wilmington, Del., assignor to Hercules Incorporated, a corporation of Delaware
No Drawing. Filed Sept. 17, 1964, Ser. No. 397,314
9 Claims. (Cl. 260—24)

This application is a continuation-in-part of my application U.S. Serial No. 4,594, filed January 26, 1960, now U.S. 3,158,591, which is in turn a continuation-in-part of my application U.S. Serial No. 738,627, filed May 29, 1958, now abandoned, and of my application U.S. Serial No. 812,079, filed May 11, 1959, now U.S. 3,135,705 issued June 2, 1964, which is in turn a continuation-in-part of my application U.S. Serial No. 738,626, filed May 29, 1958, now abandoned.

This invention relates to new polymeric epoxides, and more particularly, to copolymers of epihalohydrins with glycidyl esters of ethylenically unsaturated carboxylic acids.

It is well known that epichlorohydrin may be polymerized to low molecular weight homopolymers that are useful as plasticizers, etc. Such polymers have, however, been limited in their usefulness.

Now in accordance with this invention copolymers of epihalohydrins and glycidyl esters of ethylenically unsaturated carboxylic acids have been discovered. These copolymers are unique in that they are essentially linear polyethers, copolymerization having taken place through the epoxy groups. Hence, they provide two types of loci for cross-linking reactions, the halogen atoms in the epihalohydrin portions of the polymer and the ethylene double bonds in the ethylenically unsaturated epoxide portion of the polymer. As a result, it is possible to vulcanize them with standard sulfur recipes to produce excellent rubbers and, in addition, they may be vulcanized by other cross-linking processes due to the presence of the halogen atom. In addition to their ability to be vulcanized by standard sulfur recipes or by reaction of the halogen atom, those copolymers derived from glycidyl esters of α,β-unsaturated carboxylic acids are readily vulcanized through the activated double bond by means of di- and poly-active hydrogen compounds such as diamines, dialcohols, and diphenols by the well-known addition reactions of such activated double bonds under conditions where polyepihalohydrins would not be readily vulcanized. Hence, the copolymers of this invention are capable of being vulcanized under a wide variety of conditions.

The new copolymers of this invention are those produced by the copolymerization of an epihalohydrin with at least one other epoxide, at least one of which is a glycidyl ester of an ethylenically unsaturated carboxylic acid, which have the general formula

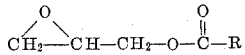

where R is an ethylenically unsaturated radical. Exemplary of such glycidyl esters are glycidyl acrylate, glycidyl methacrylate, glycidyl crotonate, glycidyl 2,4-dimethyl pentenoates, glycidyl 4-hexenoate, glycidyl 4-heptenoate, glycidyl 5-methyl-4-heptenoate, glycidyl sorbate, glycidyl linoleate, glycidyl oleate, glycidyl 3-butenoate, glycidyl 3-pentenoate, glycidyl 4-methyl-3-pentenoate, glycidyl abietate, the glycidyl ester of 3-cyclohexene carboxylic acid, the glycidyl ester of 4-methyl-3-cyclohexene carboxylic acid, etc.

Any epihalohydrin, as for example, epichlorohydrin, epibromohydrin, epifluorohydrin, or mixtures thereof, may be copolymerized with the ethylenically unsaturated glycidyl esters to produce the new polymers of this invention. In addition, other epoxides may also be incorporated in these copolymerizations so that the final copolymer may be a terpolymer, a quaternary polymer, etc. Thus, the copolymers of this invention may include, in addition to the epihalohydrin monomer units and the ethylenically unsaturated glycidyl ester monomer units, other epoxide monomer units, such as those of ethylene oxide, propylene oxide, butene-1 oxide, butene-2 oxides, dodecene-1 oxide, octadecene-1 oxide, cyclohexene oxides, styrene oxide, alkyl glycidyl ethers, phenyl glycidyl ethers, etc.

The copolymers of this invention will then contain at least the following two repeating units

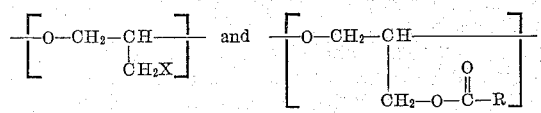

where X is halogen and R is an ethylenically unsaturated radical.

These copolymers contain from about 99.5% to about 5% of epihalohydrin and from about 0.5% to about 95% of the ethylenically unsaturated glycidyl ester and preferably will contain from about 98% to about 40% of the epihalohydrin and from about 2% to about 60% of the ethylenically unsaturated glycidyl ester. Where one or more other epoxide monomers are present, these copolymers will contain at least about 5% and preferably about 40% of epihalohydrin and at least about 0.5% and preferably about 2% of the ethylenically unsaturated glycidyl ester, so that in such terpolymers (or tetrapolymers, etc.) the unique properties of vulcanizability, etc., due to the presence of these monomers will not be lost. The amount will, of course depend somewhat upon the additional epoxide monomers incorporated. Thus, when ethylene oxide is copolymerized with the epihalohydrin and the ethylenically unsaturated glycidyl ester, in an amount up to about 50% of the total monomers, the copolymer will be essentially water insoluble, and little swollen by water, whereas in an amount above about 50%, the copolymer will generally be at least partially water soluble or highly swollen by water. Hence, they are more limited utility even though they are still capable of vulcanization. This is not true for propylene oxide and the higher alkylene oxides, since the copolymers of this invention containing high percentages of, for example, propylene oxide are still water insoluble and little swollen by water, snappy tough rubbers, which on vulcanization yield highly desirable rubbers.

The new polymeric epoxides or polyethers containing both halogen and ethylenic unsaturation of this invention may be prepared by contacting a mixture of an epihalohydrin and a glycidyl ester of an ethylenically unsaturated carboxylic acid with an organoaluminum compound. Organoaluminum compounds that may be used to catalyze the polymerization are trialkylaluminum compounds, dialkylaluminum halides, monoalkylaluminum dihalides, dialkylaluminum hydrides, dialkylaluminum monoalkoxides and the corresponding cycloalkyl and aryl compounds. These organoaluminum compounds may be reacted with a chelating agent such as acetylacetone, trifluoroacetylacetone, etc., if desired. An effective catalyst may also be produced by reacting these organoaluminum compounds, including the chelated complexes, with from about 0.1 to about 1.5 moles of water, and preferably 0.5 to 1 mole of water, per mole of the organoaluminum compound.

The polymerization reaction is generally carried out in the presence of an inert, liquid, organic diluent but may be carried out in an essentially bulk polymerization process. Suitable diluents that may be used for the polymerization are the ethers such as diethyl ether, dipropyl ether, dibutyl ether, etc., halogenated hydrocarbons such as chlorobenzene, methylene chloride, etc., or a hydrocarbon diluent such as n-heptane, cyclohexane, benzene, toluene, etc. The temperature of the polymerization process may be varied over a wide range, generally from about −80° C. to about 250° C., and preferably from about −30° C. to about 100° C., and while atmospheric or autogenous pressure is usually used, the pressure may be varied from subatmospheric up to several atmospheres, if desired.

The new epihalohydrin copolymers of this invention are solid, high molecular weight polymers which preferably have a reduced specific viscosity (RSV) of at least about 0.2, and more preferably at least about 0.5, when measured as a 0.1% solution in α-chloronaphthalene at 100° C. They can be crystalline or amorphous. The crystalline copolymers are generally useful for cross-linked, more rigid thermoplastics and the amorphous ones are generally useful for cross-linked elastomers. Both crystalline and amorphous copolymers are useful in foams. Because of the added cross-linkability of these copolymers, they can be vulcanized under a wider variety of conditions and thus are more useful than the simple polyepihalohydrins in some applications. In the case of the elastomeric copolymers, one can obtain greater versatility of use and in many cases better properties. In the case of the more rigid or harder, initially thermoplastic compositions, the cross-linked product also has greater use versatility and better properties at elevated temperatures.

The following examples illustrate the preparation of the new high molecular weight epihalohydrin copolymers in accordance with this invention. All parts and percentages are by weight unless otherwise indicated. The molecular weight of the polymers is shown by their Reduced Specific Viscosity (RSV). By the term "Reduced Specific Viscosity" is meant the $\eta_{sp}/C$ determined on a 0.1% solution of the polymer in a α-chloronaphthalene containing 0.1 g. of the polymer per 100 ml. of solution at 100° C. In the case of polymers wherein the catalyst has not been removed or only partially removed, the RSV can be measured by adding 3% of acetylacetone to the α-chloronaphthalene and obtain essentially the same value as if no catalyst were present.

*Example 1*

Epichlorohydrin (9 parts) was copolymerized with glycidyl methacrylate (1 part) by charging toluene and the two monomers to a polymerization vessel to which the air had been replaced with nitrogen and, after equilibrating at 30° C., injecting a solution of the catalyst. The catalyst used was that prepared by reacting a 0.5 M solution of triethylaluminum in 70:30 n-heptane:diethyl ether with 1 mole of acetylacetone per mole of triethylaluminum and then with 0.5 mole of water per mole of aluminum, the amount of this catalyst solution used being that equal to 0.46 part of triethylaluminum. The total diluent amounted to 86 parts, of which 92% was toluene, 5% diethyl ether, and the remainder n-heptane. The polymerization reaction was carried out for 48 hours at 30° C. The polymerization reaction was stopped and the copolymer was isolated by diluting the reaction mixture with ether, collecting the ether-insoluble polymer, slurrying it with a 1% solution of hydrogen chloride in ethanol, again collecting and washing it with methanol until neutral and finally with a 0.4% solution of Santonox, i.e., 4,4′-thiobis(6-tert-butyl-m-cresol), in methanol, after which it was dried. The epichlorohydrin—glycidyl methacrylate copolymer so obtained was a tough, rubbery polymer, insoluble in ether. It had an RSV of >0.1 as measured in α-chloronaphthalene at 100° C. It contained 15% glycidyl methacrylate based on chlorine analysis and X-ray showed it to be largely amorphous.

*Example 2*

A polymerization vessel with a nitrogen atmosphere was charged with toluene, 9 parts of epichlorohydrin and 1 part of glycidyl methacrylate. After equilibrating the vessel and contents at 30° C., a solution of the catalyst was injected. The catalyst used was that prepared by adding to a 0.5 molar solution of triethylaluminum in 70:30 n-heptane:diethyl ether, 0.5 mole of water per mole of triethylaluminum, the addition being carried out at 0° C. during a period of 15 minutes, the reaction mixture stirred for one hour at 0° C., and then adding 0.5 mole of acetylacetone per mole of aluminum, again stirring for 15 minutes at 0° C., and then for 20 hours at room temperature, the amount of catalyst used being equal to 0.46 part of triethylaluminum. The total diluent amounted to 86 parts, of which 92% was toluene, 5% ether and 3% n-heptane. After 18 hours at 30° C., the polymerization was stopped by adding 4 parts of anhydrous ethanol and the reaction mixture was diluted with ether and then washed once with 3% aqueous hydrogen chloride. To the organic layer was added excess methanol to precipitate the polymer, which was then separated, washed with methanol until neutral, and then with a solution of 0.4% Santonox in methanol. After drying for 16 hours at 80° C. under vacuum, the copolymer so obtained amounted to a 4.5% conversion and as a tough rubber. This rubber was extracted with acetone (30 parts per part of rubber) by agitating overnight at room temperature. The insoluble material was collected, washed twice with acetone and once with a 0.05% solution of Santonox in acetone and then was dried. It amounted to 89% of the total polymer and was shown to be partially crystalline by X-ray analysis and had an RSV of >3 as measured on a 0.1% solution in α-chloronaphthalene containing 3% acetylacetone at 100° C. Based on chlorine analysis, it contained 13.3% glycidyl methacrylate. The acetone-soluble fraction was recovered by evaporating off the acetone and then drying. This portion of the copolymer amounted to 11% of the total and, based on chlorine analysis, contained 16.5% glycidyl methacrylate and had an RSV of >0.3 as measured on a 0.1% solution in α-chloronaphthalene containing 3% acetylacetone at 100° C.

*Example 3*

Example 2 was repeated except that in this case the catalyst solution was prepared by diluting a 1 M solution of triisobutyl aluminum in n-heptane to 0.5 molar with diethyl ether, then during 15 minutes addding 0.6 mole of water per mole of aluminum while stirring at 20° C. and finally stirring the reaction mixture for 20 hours at room temperature. The amount of catalyst used corresponded to 0.79 part of triisobutyl aluminum. The total diluent in the polymerization system was 94% toluene, 3% ether and 3% n-heptane. The total methanol-insoluble product amounted to a 12% conversion was a tough rubber. On extraction with acetone, it was fractionated into 41% acetone-insoluble and 59% acetone-soluble, both fractions being tough, rubbery solids. The acetone-insoluble copolymer was moderately to highly crystalline by X-ray, and, based on chlorine analysis, contained a 1.3% of glycidyl methacrylate. After milling at 106° C., it was a very tough, low elongation rubber (due to crystallinity) and had an RSV of 0.71. The acetone-soluble copolymer had an RSV of 0.85 and, based on chlorine analysis, contained 1.5% glycidyl methacrylate.

*Example 4*

Example 2 was repeated except that 1 part of glycidyl crotonate was substituted for the 1 part of glycidyl methacrylate used in that example. The polymerization was carried out at 30° C. for 48 hours. The reaction mixture was then diluted with ether and the methanol-insoluble copolymer was isolated as described in that example.

It was a tough, rubbery solid and had an RSV greater than 0.5.

*Example 5*

Example 2 was repeated except that 1 part of glycidyl 3-butenoate was substituted for the glycidyl methacrylate used in that example. The methanol-insoluble copolymer so obtained was a tough rubber with an RSV of 4.0.

*Example 6*

A polymerization vessel with a nitrogen atmosphere was charged with 318 parts of dry toluene, 4.0 parts of the glycidyl ester of tall oil fatty acids (60% linoleic acid, 31% oleic acid and 9% of saturated $C_{16}$ to $C_{20}$ fatty acids), 4.0 parts of ethylene oxied and 32.0 parts of epichlorohydrin. With the vessel and contents equilibrated at 30° C., there was added an amount of 0.5 molar solution of the catalyst described in Example 2 equal to 1.80 parts of triethylaluminum. After 19 hours at 30° C., the polymerization reaction was shortstopped by adding 16 parts of anhydrous ethanol containing 0.05 part of a stabilizer which was the condensation product of crotonaldehyde with about 3 moles of 3-methyl-6-tert-butylphenol. The polymer was precipitated by adding 300 parts of a commercial heptane mixture containing 0.04% of the same stabilizer used above. The supernatant was decanted off; the polymer was agitated with 300 parts more of the precipitant, the supernatant decanted and again repeating this wash procedure. The polymer was then separated by filtration and dried for 16 hours at 80° C. under vacuum. It amounted to 6.1 parts (15.2% conversion) and was a rubbery solid having an RSV of 3.7 as measured on a 0.1% solution in α-chloronaphthalene containing 3% acetylacetone at 100% C. Based on chlorine and bromine-number analysis, the copolymer contained 53% epichlorohydrin, 36% ethylene oxide, and 11% of the glycidyl ester. It was amorphous by X-ray.

*Example 7*

Example 6 was repeated except that the glycidyl ester of a commercial pale grade of wood rosin (freed of neutrals and containing about 30% of abietic acid) was used in place of the glycidyl ester of the tall oil fatty acids used in that exmaple. The polymer so obtained amounted to 7.3 parts (18.3% conversion) of a rubbery solid. It had an RSV of 4.9 as measured on a 0.1% solution in α-chloronaphthalene containing 3% acetylactetone at 100° C. Based on chlorine and bromine-number analysis, the copolymer contained 57% epichlorohydrin, 37% ethylene oxide, and 6% of the glycidyl ester of rosin. It was amorphous by X-ray.

The copolymers produced in Examples 6 and 7 were each vulcanized using the following recipe based on 100 parts of polymer:

| | Parts |
|---|---|
| HAF carbon black | 50 |
| Phenyl-β-naphthylamine | 1.0 |
| Zinc oxide | 5.0 |
| Stearic acid | 1.0 |
| 2-mercaptobenzothiazole disulfide | 1.0 |
| Tetramethyl thiuram disulfide | 2.0 |
| Sulfur | 2.0 | and curing for 45 minutes at 154° C. The vulcanizates so obtained had the following properties:

| | Copolymers of— | |
|---|---|---|
| | Example 6 | Example 7 |
| Modulus 300%, p.s.i | 1,185 | 440 |
| Tensile, p.s.i | 1,770 | 965 |
| Elongation | 605 | 900 |
| Shore Hardness A2 | 66 | 56 |
| Break Set | 15 | 40 |

What I claim and desire to protect by Letters Patent is:
1. A solid copolymer of an epihalohydrin and at least one other epoxide, at least one of which other epoxides is a glycidyl ester of an ethylenically unsaturated carboxylic acid having the formula

$$CH_2{-}\overset{O}{\overset{}{\diagdown}}CH{-}CH_2{-}O{-}\overset{O}{\overset{\|}{C}}{-}R$$

where R is an ethylenically unsaturated group, said copolymer being essentially a linear polyether wherein polymerization is through the epoxide groups and containing at least about 5% by weight of repeating units derived from epihalohydrin and at least about 0.5% by weight of repeating units derived from said glycidyl ester, said copolymer having a reduced specific viscosity of at least 0.1 as measured on a 0.1% solution in α-chloronaphthalene at 100° C.

2. The copolymer of claim 1 wherein the epihalohydrin is epichlorohyrin.

3. The copolymer of claim 2 wherein R is an ethylenically unsaturated aliphatic hydrocarbon radical.

4. The copolymer of claim 2 wherein R is an ethylenically unsaturated cycloaliphatic hydrocarbon radical.

5. A solid copolymer of epichlorohydrin and glycidyl methacrylate, said copolymer being a linear polyether wherein polymerization is through the epoxide groups, and containing from about 99.5% to about 5% epichlorohydrin and from about 0.5% to about 95% of glycidyl methacrylate, said copolymer having a reduced specific viscosity of at least 0.1 as measured on a 0.1% solution in α-chloronaphthalene at 100° C.

6. A solid copolymer of epichlorohydrin and glycidyl crotonate, said copolymer being a linear polyether wherein polymerization is through the epoxide groups, and containing from about 99.5% to about 5% epichlorohydrin and from about 0.5% to about 95% of glycidyl crotonate, said copolymer having a reduced specific viscosity of at least 0.1 as measured on a 0.1% solution in α-chloronapthalene at 100° C.

7. A solid copolymer of epichlorohydrin and glycidyl 3-butenoate, said copolymer being a linear polyether wherein polymerization is through the epoxide groups, and containing from about 99.5% to about 5% epichlorohydrin and from about 0.5% to about 95% of glycidyl 3-butenoate, said copolymer having a reduced specific viscosity of at least 0.1 as measured on a 0.1% solution in α-chloronaphthalene at 100° C.

8. A solid copolymer of epichlorohydrin, ethylene oxide and the glycidyl ester of tall oil fatty acids, said copolymer being a linear polyether wherein polymerization is through the epoxide groups, and containing at least about 40% epichlorohydrin and at least about 2% of said glycidyl ester and having a reduced specific viscosity of at least 0.1 as measured on a 0.1% solution in α-chloronaphthalene at 100° C.

9. A solid copolymer of epichlorohydrin, ethylene oxide and the glycidyl ester of rosin acid, said copolymer being a linear polyether wherein polymerization is through the epoxide groups, and containing at least about 40% epichlorohydrin and at least about 2% of said glycidyl ester and having a reduced specific viscosity of at least 0.1 as measured on a 0.1% solution in α-chloronaphthalene at 100° C.

References Cited by the Examiner

UNITED STATES PATENTS

| | | | |
|---|---|---|---|
| 2,476,922 | 7/1949 | Shokal | 260—78.4 |
| 3,031,439 | 4/1962 | Bailey | 260—88.3 |
| 3,135,705 | 6/1964 | Vandenberg | 260—2 |

FOREIGN PATENTS 226,554  4/1958  Australia.

LEON J. BERCOVITZ, *Primary Examiner.*

C. W. IVY, *Assistant Examiner.*